(No Model.)

J. R. DOBSON & J. D. PEIRSON.
NUT LOCK.

No. 422,337. Patented Feb. 25, 1890.

WITNESSES:

INVENTORS.

BY

ATTORNEY.

UNITED STATES PATENT OFFICE.

JOHN R. DOBSON AND JOHN D. PEIRSON, OF PHŒNIXVILLE, PENNSYLVANIA.

NUT-LOCK.

SPECIFICATION forming part of Letters Patent No. 422,337, dated February 25, 1890.

Application filed July 11, 1889. Serial No. 317,150. (No model.)

*To all whom it may concern:*

Be it known that we, JOHN R. DOBSON and JOHN D. PEIRSON, citizens of the United States, residing at Phœnixville, in the county of Chester and State of Pennsylvania, have invented a new and useful Improvement in Nut-Fasteners, which improvement is fully set forth in the following specification and accompanying drawings.

Our invention relates to improvements in nut-fasteners; and it consists in the novel construction and arrangement of the parts thereof, as will be more fully hereinafter set forth.

Figure 1:
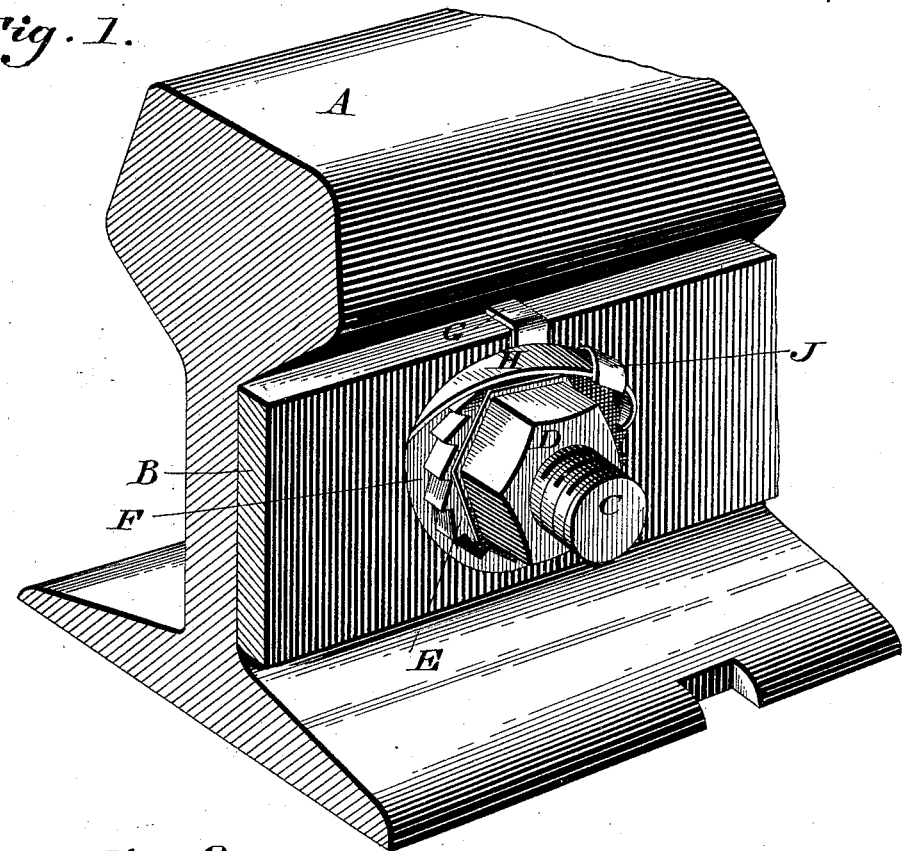
Figure 2:
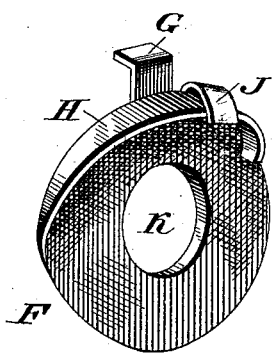
Figure 3:
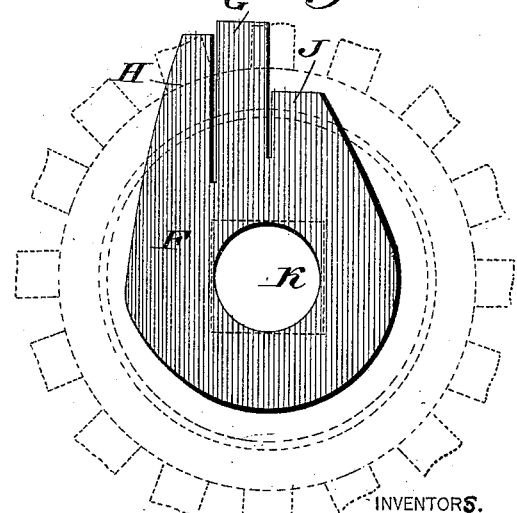

Figure 1 represents a perspective view of a nut lock or fastener embodying our invention, the same being shown applied to a railroad-rail. Fig. 2 represents a perspective view of a fastener embodying our invention. Fig. 3 represents a plan view of the blank employed in constructing our improved fastener.

Similar letters of reference indicate corresponding parts in the several figures.

Referring to the drawings, A designates a part of a rail having a fish-plate B in connection therewith. A bolt C is adapted to pass through said parts and receive a nut D fitting in a ratcheted washer E. Interposed between said washer E and the fish-plate is the fastener F, the same consisting of a plate having an arm G, to fit over the fish-plate, a dog, H, with its nose or end designed to engage the teeth of the said washer E, and a guard J embracing the dog and adapted to keep the same in proper position relatively with the ratcheted washer E and limit its outward motions. The fastener F is formed from a sheet-metal blank and cut to provide the members G, H, and J, and an eye K, as fully shown in Fig. 3. The dog H is bent up and curved, as shown in Fig. 2, the arm G given the necessary angle, and guard J struck up over the dog H.

In applying the device the fastener F is placed over the end of the bolt C and against the fish-plate B, and the arm G thereof adjusted over the one edge of said plate. The ratcheted washer E is then mounted against said fastener F and the nut D screwed on the bolt C to bear upon said washer. As the bolt is tightened the dog H engages the washer E and securely holds the nut, thereby preventing the same from loosening. The arm G obviates any tendency to lateral movement of the fastener.

It is obvious that the nut D may be formed with a ratcheted rim and used instead of the separate ratchet washer and nut, as shown. It is also apparent that the invention may be applied in connection with wheel-axles and hubs of vehicles to lock the nuts thereof. In this case the axle or journal has a squared portion, and the fastener has an angular opening to receive said portion, as will be seen in Fig. 3, the fastener and its parts being within the rim of the hub, so as to be conveniently accessible for releasing the dog or tooth of the fastener when the hub requires removal, as also seen in Fig. 3. The arm is not required in this application of the fastener.

Having thus described our invention, what we claim as new, and desire to secure by Letters Patent, is—

In a nut-lock, a washer with ratchet-teeth, a sheet-metal fastener with an opening therein, and having a rearwardly-projecting arm G, a forwardly-projecting dog H, and the guard J for said dog, said arm, dog, and guard being integral with said fastener, said parts being combined substantially as described, and adapted to operate with a screw-bolt and a nut, the latter fitting in said washer, as stated.

JOHN R. DOBSON.
JOHN D. PEIRSON.

Witnesses:
JOHN A. WIEDERSHEIM,
A. P. JENNINGS.